Oct. 29, 1968  S. A. LAKES  3,408,149
LIQUID APPLICATOR
Filed June 1, 1965  2 Sheets-Sheet 1

Inventor
Sigmund A. Lakes
By: Snow and Benno
Attys.

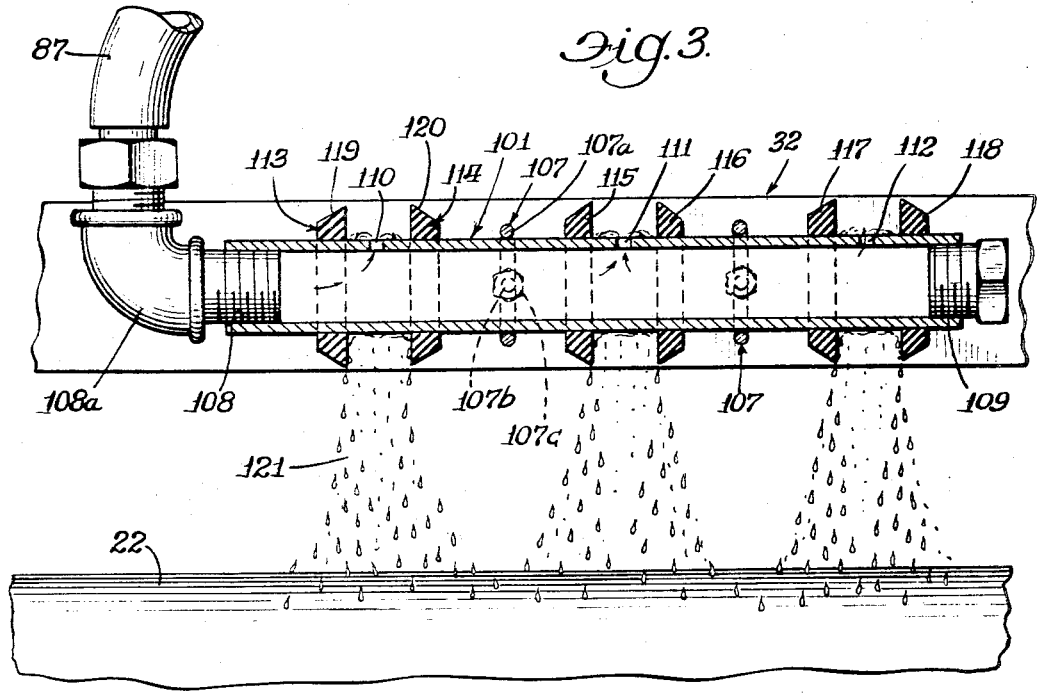
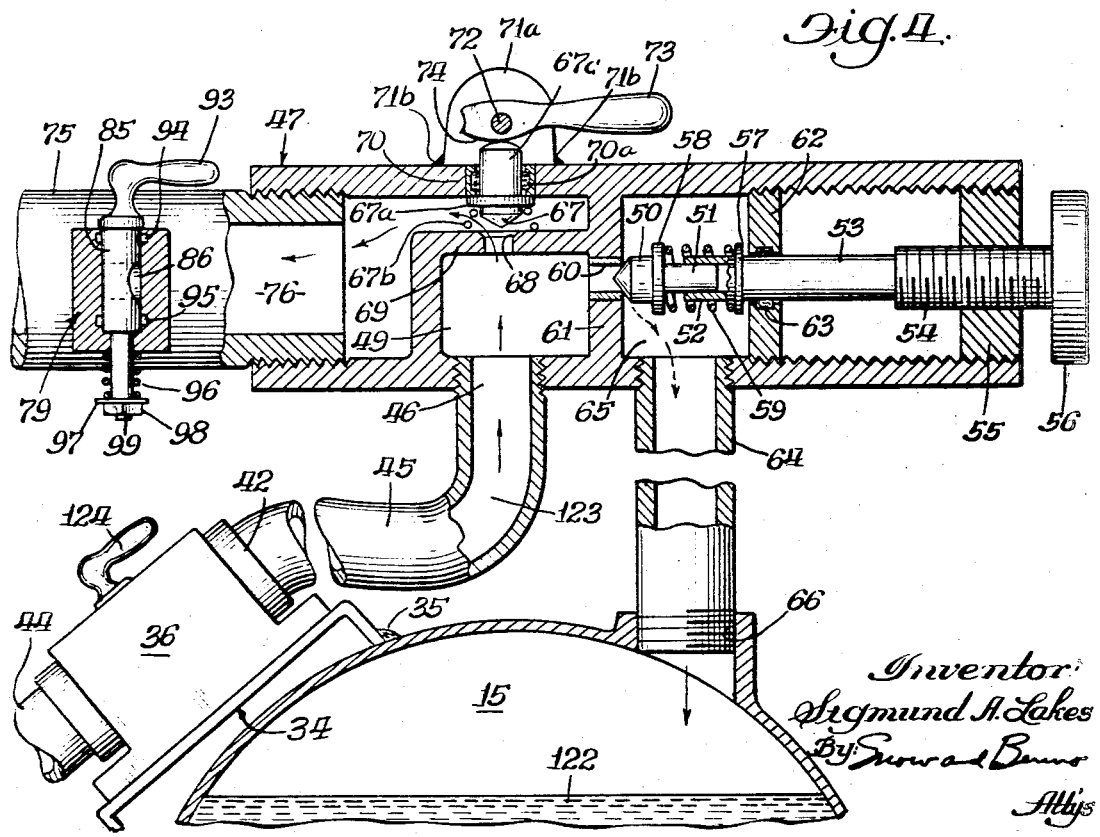

United States Patent Office 3,408,149
Patented Oct. 29, 1968

3,408,149
LIQUID APPLICATOR
Sigmund Allen Lakes, Dundee, Ill., assignor to Lakes Supply Co., Inc., a corporation of Illinois
Filed June 1, 1965, Ser. No. 460,091
2 Claims. (Cl. 401—147)

ABSTRACT OF THE DISCLOSURE

The uniform wetting of the surface of a ground engaging roller for the application of the surface liquids to the ground.

---

This invention relates to a new and improved applicator for liquids such as weed killers and fertilizers.

The application of liquids for the purpose of killing weeds or applying fertilizers to crops has long been a problem. With the advent of liquid weed killers and the more prevalent use of liquid fertilizers, machinery manufacturers have attempted to develop means for distributing these liquids to selected crops or lawns in an effort to kill weeds or to fertilize plants. Most of these liquid distributing devices have taken the form of sprayers. Selective application with spraying devices is extremely difficult especially if there is any wind at the time of liquid distribution. This of course results in weed killers being applied to the wrong vegetation and causing undesired killing of that vegetation. And similarly if fertilizer is distributed by spraying it oftentimes reaches plants which should not have that fertilizer.

Others have previously tried to apply liquids to vegetation by wetted rollers but these devices were generally unsuccessful because they were not capable of uniform liquid distribution upon even the slightest inclination of the wetting roller. Uneven ground terrain would cause tilting of the wetting roller and the liquid would be applied only to vegetation at one end of the roller.

It is therefore a principal object of the present invention to provide a new and novel liquid applicator for the distribution of liquids such as weed killers and fertilizers.

Another important object of this invention is the provision of novel means in the form of a wetted roller for distributing liquid weed killers or fertilizers.

Another important object of this invention is to equip a liquid applicating device with novel means for wetting a ground engaging roller with the liquid to be distributed and in a manner to effectively uniformly wet the entire length of the roller despite inclinations of the roller.

A still further important object of this device is to provide a liquid applicator for chemicals such as weed killers and fertilizers which is not subject to interference by winds.

Another important object of this invention is the provision of novel reservoir tank means carried in association with a ground engaging roller and including means for delivering liquid from the reservoir to the roller in a manner to effectively wet the full surface of the roller for distribution to vegetation over which the device is drawn.

Still another important object of this invention is to supply a device such as set forth in the preceding object and including therein pump means for causing the delivery of liquid from the reservoir to the roller.

Another and still further important object of this invention is to equip a liquid distributing device as set forth in the preceding objects with a pressure equalizing tube and including adjustable valves for carrying liquid from the equalizing tube to a plurality of transversely positioned overlapping boom sections which in turn cause substantially uniform dripping of the liquid to the roller for wetting the entire surface of the roller.

Still another important object of this invention is to provide a novel liquid distributing boom for feeding a ground engaging wetting roller which generally comprises a plurality of cylindrical pipe-like housings disposed in a generally horizontal plane with spaced apart openings on the top side and anti-liquid roll ring members therearound flanking each opening whereby regardless of the inclination of the wetting roller there will be substantially uniform distribution of liquid along the length of the roller by means of delivery of liquid to the plural boom sections where it regularly drips from each of the openings in the housing around the outside of the boom section housings and between the annular anti-liquid roll ring members down to the upper surface of the ground engaging wetting roller.

Another and still further important object of this invention is the provision of a liquid distributor for use in agriculture wherein the liquid from a reservoir tank is placed under a slight pressure and delivered to an equalizing or liquid distributing tube whereafter restricting valve means in spaced apart positions on the tube permit flow by gravity to a multi-sectioned boom having a plurality of discharge openings therein for insuring substantially uniform distribution of the liquid along the full length of a ground wetting roller.

Other and further important objects and advantages will become apparent from the disclosures in the following specification and accompanying drawings.

In the drawings:

FIGURE 3 is a longitudinal detailed sectional view of one of the many boom sections of the device as shown in FIGURES 1 and 2.

FIGURE 4 is a partial sectional view taken on the line 4—4 of FIGURE 1 showing the interior of the liquid equalizer tube and also showing the valving mechanism between the reservoir and the tube and the pump and the tube.

As shown in the drawings:

Figures 1, 2:
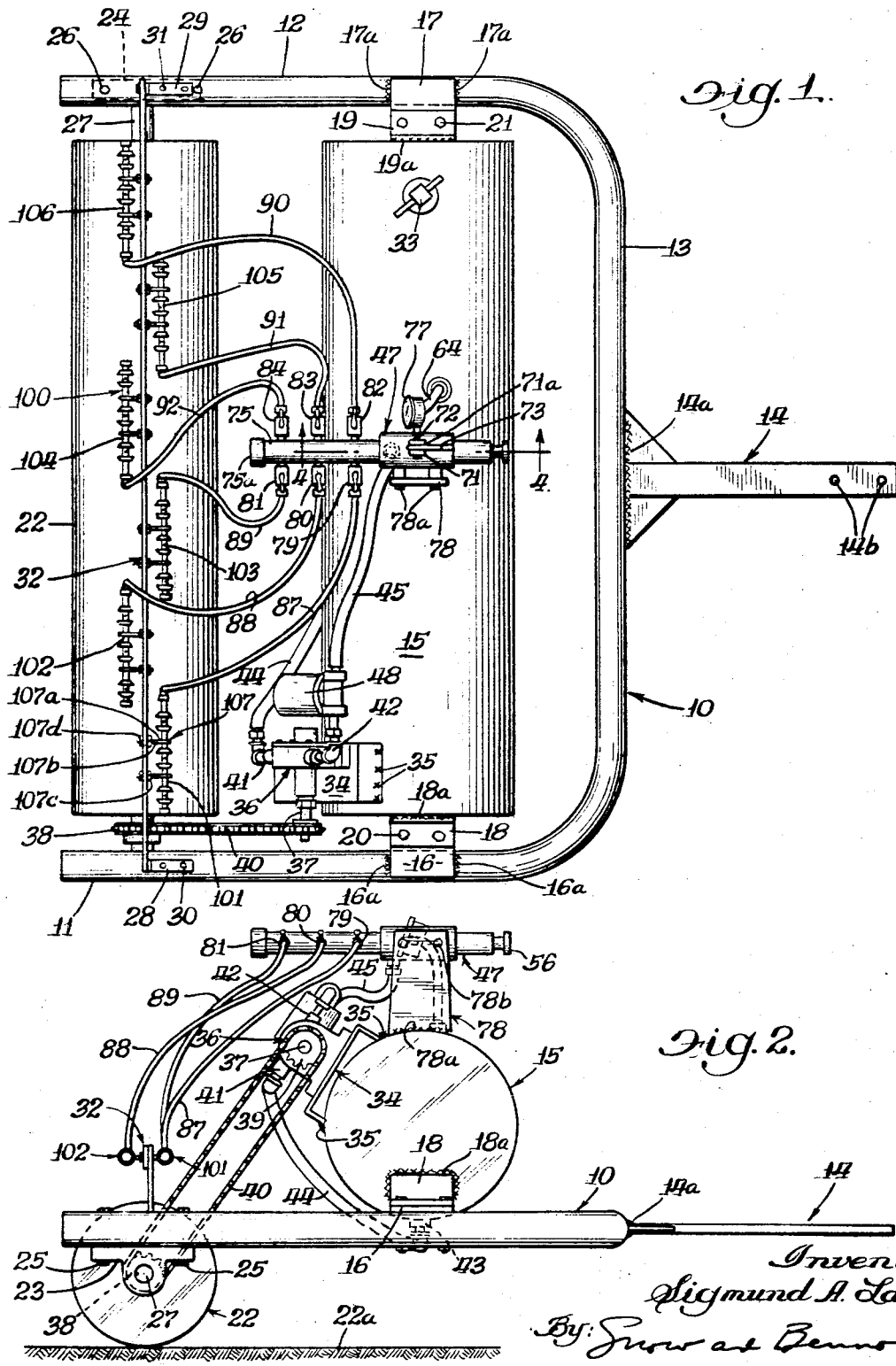
FIGURE 1 is a top plan view of the liquid distributor of this invention.
FIGURE 2 is a side elevational view of the liquid distributor of FIGURE 1.

The reference numeral 10 indicates generally a frame supporting structure for the liquid applicator of this invention. Generally the frame is U-shaped and comprises spaced apart parallel side arms 11 and 12. The base of the U-frame is shown at 13 and in this instance forms the forwardly disposed front end of the frame. The front frame member 13 joins the laterally spaced arms 11 and 12 and it is within and on these frame elements that the liquid applicator of this invention is mounted. A tongue 14 is welded or otherwise fastened at 14a to the center of the front member 13 and projects forwardly therefrom. The forward end of the tongue is equipped with holes 14b. These holes are used to attach the applicator to a hitch on a pulling vehicle such as a tractor, which is not shown. Or, the applicator may be designed to be self-propelled as desired.

The frame structure 10 carries a liquid reservoir tank 15. The tank 15 is cylindrical in shape and is disposed horizontally between the side arms 11 and 12 of the frame 10. A generally horizontally disposed plate 16 is weldably fastened at 16a to the top side of the frame arm 11. Similarly a horizontally disposed plate 17 is weldably fastened at 17a to the top side of the frame arm 12. An angle member 18 has its vertical side thereof fastened by means of welds 18a to one end wall of the reservoir 15. A corresponding angle member 19 is welded as shown at 19a to the other end of the reservoir 15. The horizontal flanges of the angles 18 and 19 are adapted to rest on the respective horizontal plates 16 and 17 and are bolted thereto as shown at 20 and 21. This mounting supports the reservoir 15 between the arms 11 and 12 of the U-shaped frame and generally above those arms.

A ground engaging wetting roller 22 is mounted on the frame structure 10 between the arms 11 and 12 and is disposed generally rearwardly of and lower than the reservoir tank 15. The wetting roller 22 is generally cylindrical in shape and in its horizontal transverse position is capable of rolling over the ground, identified by the numeral 22a, to apply a liquid in the control of weeds or the application of fertilizers to vegetation growing in the ground. Transversely aligned hanger bearings 23 and 24 are fastened to the underside of the respective arms 11 and 12 by means of bolts 25 and 26. The bearings 23 and 24 are adapted to receive a transversely disposed shaft 27 on which the ground engaging wetting roller 22 is mounted. In the present instance the ground engaging roller 22 is arranged and constructed to drive the liquid distributing mechanism and therefore the mounting of the roller 22 on the shaft 27 is made with keys to provide for concurrent rotation of the roller 22 and the roller shaft 27.

Angle members 28 and 29 are fastened respectively to the top sides of the spaced frame arms 11 and 12 by means of bolts 30 and 31. The top sides of the angles 28 and 29 carry a transverse boom supporting bar 32. It is on this bar 32 that the multiple boom sections of this invention are mounted.

The reservoir tank 15 is equipped with a fill plug 33 to enable an operator to fill the reservoir with the liquid he desires to distribute. A bracket 34 is welded at 35 near one end and at the forward top side of the reservoir tank 15. A liquid pump 36 is mounted on the bracket 34 and is utilized to remove and elevate the liquid from the reservoir tank 15 immediately prior to its distribution. A shaft 37 passes through the pump and provides the means for driving the pump elements (not shown). A sprocket 38 is mounted on and keyed to the wetting roller shaft 27. A sprocket 39 is mounted on and keyed to the pump shaft 37. The sprockets 38 and 39 are in planar alignment and are joined by means of a chain 40. Thus as the device of this invention is pulled, the frictional engagement of the wetting roller 22 with the ground causes concurrent rotation of the roller and its shaft 27. There is therefore a rotational drive imparted to the pump 36 through the chain 40. The pump 36 is provided with an inlet port 41 and an outlet or pressure side 42. The reservoir 15 is provided with an outlet 43 on the bottom thereof and by means of a flexible conduit or hose 44 the outlet 43 on the reservoir tank is joined to the inlet 41 on the pump. Operation of the pump thus causes a pulling of the liquid from the reservoir tank 15 through the hose 44 to the inlet side of the pump 36. The pump thereupon discharges liquid under pressure through the outlet 42 and thence through a flexible conduit or hose 45 which joins the outlet 42 of the pump 36 to an inlet 46 of a liquid equalizing tube 47. A filter 48 is provided in the conduit 45 and insures the removal of any foreign matter from the liquid to be distributed prior to its entrance into the equalizing tube 47 and its many valve mechanisms and liquid distributing boom sections through which the liquid must pass prior to its deposit on the top surface of the wetting roller 22.

As best shown in FIGURE 4 the liquid equalizing tube 47 is provided with a chamber 49 just inside the inlet port 46. A check valve 50 having a guide shank 51 is disposed horizontally within the liquid equalizing tube 47. A cooperative sleeve 52 at the inner end of a shaft 53 is adapted to telescope over the guide shank 51 of the check valve 50. A threaded portion 54 on the shaft 53 engages cooperative internal threads in an end wall 55 of the tube 47. A hand operating wheel 56 forms an integral part of the shaft 53 so that upon rotation of the wheel the shaft is concurrently rotated. The shaft 53 is provided with an annular flange 57 immediately above the sleeve end portion 52. The valve 50 is equipped with an annular flange 58 at the inner end of the guide shank 51. A coil spring 59 is mounted around the telescoping guide shank 51 and sleeve 52 between the annular flanges 57 and 58 thereupon urging the check valve 50 toward closed or seating position against seat 60 in a generally vertical wall 61 forming part of the chamber 49. The spring thus urges the separation of the valve 50 from the shaft 53. An intermediate wall 62 is provided in the liquid equalizer tube 47 and is disposed parallel to and spaced from the wall 61. The shaft 53 is journally supported within this wall 62. A sealing or packing member 63 is provided around the shaft 53 and within a central opening in the intermediate wall 62. A flexible conduit 64 is joined at one end to a chamber 65 in the equalizer tube 47. The other end of the conduit 64 is attached at 66 to the top side of the reservoir tank 15. The function of the check valve 50 is to permit bypassing of liquid under pressure back to the reservoir 15 through the conduit 64. When the valve 67 is closed the chamber 49 is closed. In this condition the chamber 49 will fill with liquid delivered thereto by the pump 36. When the liquid in the chamber 49 is under sufficient pressure to open the check or pressure relief valve 50 the liquid will pass into the chamber 65 and thence back to the reservoir. The check valve 50 will yield and open upon compressing of the spring 59 causing a further telescoping of the guide shank 51 within the sleeve 52. The degree of pressure required to open the check valve 50 may be adjusted by a rotation of the hand wheel 56 thereupon further compressing or relaxing the spring 59 depending upon the direction of rotation of the hand wheel. The check valve 50 thus acts as a safety or relief valve for the liquid system of this invention when the pressure of the liquid to be distributed exceeds some predetermined minimum.

A valve 67 has an annular shoulder 67a with a coil spring 67b surrounding the valve beneath the shoulder to urge the valve upwardly away from a cooperative seat 68 in a top wall 69 of the chamber 49 within the equalizer tube 47. The spring 67b reacts against the wall 69 and normally urges the valve 67 upwardly to an open position by reason of its engagement with the annular flange 67a. As shown in FIGURE 4 the valve 67 is slidably received through an opening in the top wall 70 of the tube 47. Packing or sealing means 70a are provided around an upwardly extending shank portion 67c of the valve 67. Transversely spaced apart brackets 71 and 71a are welded at 71b to the top 70 of the tube 47. A pin 72 is supported in the spaced apart brackets 71 and 71a and carries an operating handle 73 between the spaced brackets. A cam surface 74 is provided on the inner end of the handle 73 to engage the top side of the vertically movable valve member 67. In the position of the handle 73 as shown in FIGURE 4 the valve member 67 is shown open or in spaced apart position from its cooperative seat 68 thereupon permitting liquid delivered by the pump 36 through the conduit 45 and thence into the chamber 49 to move past the valve 67 and into a rearward extension 75 of the equalizer tube 47. The internal chamber within the elongated end 75 is indicated by the numeral 76. Thus in the function of the device as illustrated in FIGURE 4 the check valve 50 remains closed so that liquid is not bypassed to the reservoir tank 15 but rather is delivered under pressure past the open valve 67 and into the chamber 76 of the end 75 of the equalizing tube 47 for subsequent distribution to a boom used in the wetting of the ground engaging roller 22. However, when it is desired to halt operation of liquid distribution the operating handle 73 is raised above the pin 72 as a hinge causing the cam surface 74 to push the valve 67 downwardly against the action of the spring 67b and thus engage the seat 68 and close the passageway between the chambers 49 and 76. In this condition if the device is further pulled the operation of the pump will merely cause a bypassing of the liquid back to the reservoir by reason of a yielding of the check or relief valve 50 as previously described. A pressure gauge 77 is arranged to communicate with the chamber 49 and give visual indication of the amount of liquid pressure built up by the pump therein. Thus if at any time the pressure exceeds a desired amount within the chamber 49, and also within the chamber 76 to which the chamber 49 communicates when the valve 67 is opened, the adjustment on the relief valve spring 59 may be relaxed so that either all or a portion of the liquid delivered to the chambers 49 and 76 may be bypassed back to the reservoir. A plate-like bracket 78 is weldably fastened at 78a to the top surface of the reservoir tank 15. The upper end of the plate bracket 78 is adapted to firmly carry the equalizer tube 47 by means of bolts 78b. The tube 47 is thus disposed generally horizontally in a fore and aft direction above the reservoir tank 15 and substantially midway between the frame arms 11 and 12.

A plurality of spaced apart valves 79, 80, 81, 82, 83 and 84 are fixedly mounted alongside the rearward extension 75 of the liquid equalizing tube 47. An end cap 75a closes the end of the tube extension 75 and thus liquid delivered to the chamber 76 must pass through one or more of the valve members 79 to 84 inclusive to exit from the chamber 76. An enlarged detail of the valve 79 is shown in FIGURE 4. The remaining valves 80 to 84 inclusive are identically constructed. The valve 79 is provided with a cylindrical rotor 85 mounted in a vertical opening 86 in the valve body. A passage 86 is disposed horizontally through the rotor member 85 approximately midway in the valve body 79. The rotational position of the valve rotor 85 controls the delivery of liquid from the chamber 76 to a flexible hose 87 which extends downwardly and rearwardly to a boom section to be subsequently described. Corresponding flexible hoses 88, 89, 90, 91 and 92 are provided for each of the valves 80 to 84 respectively to deliver the liquid passing through the valves to the multi-sectioned boom to be described. A hand lever 93 is formed integrally with the valve rotor 85 at the top thereof and facilitates manual adjustment of the valve rotors. Spaced apart annular packing or sealing elements 94 and 95 are located near the upper and lower ends of the rotor within the valve body 79. This effects a confining of the liquid within the valve and permits a positive directing of the liquid passing therethrough to the discharging flexible hose. A spring 96 surrounds a lower extension of the valve rotor 85 extending beneath the valve body 79. A collar 97 is adjustably positioned by means of a nut 98 threadedly engaging an extension 99 of the rotor 85 to thus regulate the tension of the spring 96 for effectively holding the cock-like valve tightly within its cooperative body 79. The plurality of separably adjustable valves 79 to 84 inclusive are "tuned" or adjusted to provide for uniform delivery of liquid to each of the flexible hoses 87 to 92 inclusive. The purpose of providing for this accurate adjustment for the delivery of liquid through the hoses is to uniformly fill a multi-sectioned liquid distributing boom 100.

The boom 100 is composed of a plurality of boom sections. The number of such sections may be varied as desired. In the embodiment shown there are six such sections, 101, 102, 103, 104, 105 and 106. These tubular boom sections 101 to 106 inclusive are fastened by means of eye bolts 107 to the supporting bar 32. The bolts 107 have eye portions 107a which surround the tubular boom sections 101 to 106 inclusive. The bolts 107 are provided with threaded shanks 107b which project outwardly from the eyes and pass through openings in the transverse boom supporting bar 32. An inner nut 107c engages the threaded shank 107b and abuts one side of the supporting bar 32. An outer nut 107d engages the threaded shank 107b and is brought up tightly against the other side of the supporting bar 32. As shown in the embodiment illustrated in the drawings there are two such eye bolts 107 supporting each boom section. As shown in FIGURE 3 the eye bolts 107 are spaced apart along the length of the tube boom section 101.

For purposes of illustrating the detail construction, FIGURE 3 depicts an enlarged view of the tubular boom section 101. The remaining boom sections 102 to 106 inclusive are constructed in the same manner as section 101 and will not be further shown in detail. The tube 101 is provided with an inlet end 108 to which the flexible hose 87 is attached by suitable fittings 108a. There is thus provided means for delivering liquid from the equalizer tube 47 through the valve 79, through the flexible hose 87, and thence to the inlet end of the boom section 101. The other end of the tube 101 is provided with an end plug 109 thus sealing off that end to the passage of any liquid. The only openings in the boom section 101 are transversely spaced apart drip openings 110, 111 and 112 placed along the top of the boom section. When the tube 101 is filled the liquid to be distributed flows generally uniformly out through the top openings 110, 111 and 112 and over the outside of the tube where it drips down onto the wetting roller 22. Anti-liquid roll rings 113 and 114 surround the tube 101 and flank the discharge opening 110. Similar annular flange-like rings 115 and 116 flank the opening 111 and rings 117 and 118 flank the opening 112. The ring 113 is downwardly and laterally outwardly bevelled around its full circumferential surface as shown at 119. Similarly the ring 114 is provided with an oppositely disposed annular bevel extending downwardly and laterally outwardly. The anti-liquid roll rings positioned closely adjacent each discharge opening prevent liquid from rolling along the transversely disposed boom sections if the device is tilted due to uneven terrain over which the implement is used. The rings have their largest diameter adjacent the opening and their smallest diameter spaced outwardly from the opening. The other rings 115 through 118 are bevelled in the same manner as the rings 113 and 114. The purpose of the bevelling of the rings is to insure the release of the liquid to be distributed from the lowermost points of the rings adjacent the discharging openings. As the liquid to be dispersed emerges from the opening 110 it flows down over the outer cylindrical walls of the tube section 101 confined between the spaced apart anti-liquid roll rings 113 and 114. The rings 113 through 118 are preferably made of a rubber, synthetic rubber or plastic material which will inherently seal around the outer circumference of the tube and resist corrosion or attack by the liquids to be dispersed. Liquid drops 121 are released from the underside of the tube 101 or from the large diameter inside of the flanking rings 113 to 118. The liquid drops are thus directed to a particular area of the ground engaging wetting roller 22. The spacing of the discharge openings 110, 111 and 112 along the length of the tube insures a uniform distribution of liquid dropped onto the wetting roller 22. It should be understood that any number of discharge openings may be provided in each boom section or the boom sections may be short enough to accommodate only one discharge opening fed by a single conduit from the liquid equalizing tube 47. It is one of the primary functions of the device of this invention to provide for substantially uniform distribution of liquid over the full length of the wetting roller 22 regardless of the degree of transverse inclination of the implement. Once the top surface of the wetting roller 22 receives the liquid drops 121 the drops have a tendency to spread over the surface of the roller so that upon a pulling of the roller 22 over vegetation the surface liquid on the roller 22 is deposited on the vegetation extending from one end of the roller to the other.

*Operation*

The implement of this invention is either manually pulled or pulled by a tractor or other means. This pulling causes the roller 22 to rotate by reason of its engagement with the ground. The rotation of the roller 22 causes concurrent rotation of the liquid pump 36 which in turn acts to pump liquid from the reservoir tank 15 and deliver it to the liquid equalizing tube 47. With the valves 50 and 67 in the arrangement as depicted in FIGURE 4, liquid 122 from the reservoir 15 is delivered by the pump 36 through the flexible conduits 44 and 45 in the direction of the arrows 123 to the equalizing tube 47. The liquid then passes the valve seat 68 and into the elongated end chamber 76 which communicates with the plurality of valves 79 to 84 inclusive. The pump is so designed that the liquid to be distributed and reaching the chamber 76 is under only a small pressure to insure that all of the adjustable valves 79 to 84 will be fed uniformly. If the device is to be operated on inclined ground or on a particular slope of hillside the valves are adjusted to cause greater or lesser flow from each valve so that each boom section is uniformly filled. Thus each valve is "tuned" to provide for the filling of each boom section 101 to 106 inclusive with uniform quantities of liquid and under a minimum or merely gravity pressure. The device of this invention is to deliver drips from each opening in each of a plurality of boom sections to thereupon completely wet the surface of the ground engaging wetting roller 22. In the operation of the device as just described, the movement of the ground engaging roller supplies the power for pumping the liquid to the plural boom sections which in turn deposits liquid to that same ground engaging roller. When it is desired to stop operation, the operating handle 73 of the valve 67 is raised causing the valve member 67 to close against its cooperative seat 68 and thereafter liquid being pumped by the pump is merely bypassed back to the reservoir through the relief or check valve 50 which will then yield outwardly against the action of the spring 59. There will be some residual dripping from the boom sections after the valve 67 is closed. If it is desired to avoid residual dripping a control 124 located next to the pump may be pushed in to reverse the effect of the pumping action of the pump elements and cause the liquid to be sucked back from the boom sections and transmitted to the reservoir tank 15. When the pump action is reversed, operation of the implement may be stopped without any residual dripping. For this the valve 67 should be left in open positon to permit the pump to act as a suction device for liquid already in the plural boom sections and the equalizer tube 47 to thus conduct all of such liquid back to the reservoir 15.

I am aware that numerous details of construction may be varied throughout a wide range without departing from the principles disclosed herein and I therefore do not propose limiting the patent granted hereon otherwise than as necessitated by the appended claims.

What is claimed is:

1. A liquid applicator for lawns and plants comprising a lawn traversing U-shaped frame structure having laterally spaced apart generally longitudinally extending arms and an adjoining front member having means for pulling on the forward end thereof, a liquid reservoir tank arranged in a generally horizontal plane and transversely of the direction of movement of said U-shaped frame structure and mounted on and spanning the space between said spaced apart arm members, a ground engaging roller disposed generally transversely of the U-shaped frame structure and journally mounted for rotation in bearings carried beneath said spaced apart frame arms, a support bar located transversely of said applicator and substantially above said ground engaging roller and carried on said U-shaped frame structure, a plurality of liquid distributing boom sections carried on said support bar over the full length of the ground engaging roller, means for delivering liquid from said reservoir to each of said boom sections for depositing liquid over the full length of said ground engaging roller whereby upon the applicator traversing a lawn the ground engaging roller will cause a deposit of liquid on the lawn, said means for delivering liquid comprising a liquid pump and means driving said pump, said means driving the pump comprising sprocket and chain means extending from said ground engaging roller to said pump.

2. A boom for dispensing liquid to a ground engaging roller comprising a generally horizontally disposed tubular housing, means delivering liquid to one end thereof, a plug for the other end of said tubular housing, said tubular housing having at least one opening in the top thereof, annular flange means flanking both sides of said opening to prevent liquid from flowing along the tubular housing if the boom is tilted, said annular flange means including ring members sealed around the tubular housing and projecting radially outwardly therefrom, each of said ring members having its outer circumference annularly tapered downwardly and outwardly away from the opening being flanked to insure the guiding of liquid to a ground engaging roller.

References Cited

UNITED STATES PATENTS

| 1,587,583 | 6/1926 | Garland | 239—126 X |
| 1,759,988 | 5/1930 | Knapp | 239—126 |
| 2,659,625 | 11/1953 | Gramatky | 239—157 X |
| 2,683,061 | 7/1954 | Tuttle et al. | 239—566 X |
| 3,152,353 | 10/1964 | Cravener | 15—575 |
| 3,158,892 | 12/1964 | Bridger et al. | 401—219 |
| 3,301,487 | 1/1967 | Young | 239—155 XR |

FOREIGN PATENTS

| 229,701 | 3/1960 | Australia. |
| 849,740 | 9/1960 | Great Britain. |
| 106,069 | 11/1899 | Germany. |
| 1,332,340 | 6/1963 | France. |

ROBERT W. MICHELL, *Primary Examiner.*